United States Patent [19]
Gusky et al.

[11] Patent Number: 5,711,340
[45] Date of Patent: Jan. 27, 1998

[54] GAS PRESSURE REDUCING REGULATOR

[75] Inventors: Frank J. Gusky, Quinby; Gregory W. Diehl, Florence, both of S.C.

[73] Assignee: The ESAB Group, Inc., Florence, S.C.

[21] Appl. No.: 585,802

[22] Filed: Jan. 16, 1996

[51] Int. Cl.$^6$ .................................................. G05D 16/02
[52] U.S. Cl. ............................ 137/68.19; 137/116.5; 137/505.42
[58] Field of Search ........................... 137/68.19, 68.23, 137/73, 116.5, 505.42

[56] References Cited

U.S. PATENT DOCUMENTS

| | | |
|---|---|---|
| 2,688,975 | 9/1954 | Born .................................................. 137/73 |
| 2,768,643 | 10/1956 | Acomb . |
| 2,777,456 | 1/1957 | Ey . |
| 3,809,108 | 5/1974 | Hughes . |
| 3,911,948 | 10/1975 | Collins, Jr. et al. . |
| 4,064,890 | 12/1977 | Collins et al. . |
| 4,099,538 | 7/1978 | Curtis . |
| 4,171,004 | 10/1979 | Cerrato et al. .................... 137/116.5 X |
| 4,457,329 | 7/1984 | Werley et al. . |
| 4,489,751 | 12/1984 | Acomb et al. . |
| 4,516,595 | 5/1985 | Acomb . |
| 4,744,387 | 5/1988 | Otteman ............................. 137/505.42 |
| 4,913,184 | 4/1990 | Fallon ............................. 137/68.19 X |

*Primary Examiner*—Stephen M. Hepperle
*Attorney, Agent, or Firm*—Bell Seltzer Intellectual Property Law Group of Alston & Bird LLP

[57] ABSTRACT

A gas pressure reducing regulator which includes a flexible diaphragm which is biased by a spring so as to control the opening of the valve of the regulator and thus the delivery pressure of the gas being regulated. The regulator includes provision for effectively containing an accidental oxygen fire, or the like, within the body of the regulator, and protecting the internal components from ignition. Also, the regulator has provision for venting the interior of the regulator to the atmosphere in the event of an excessive overpressure therein.

10 Claims, 5 Drawing Sheets

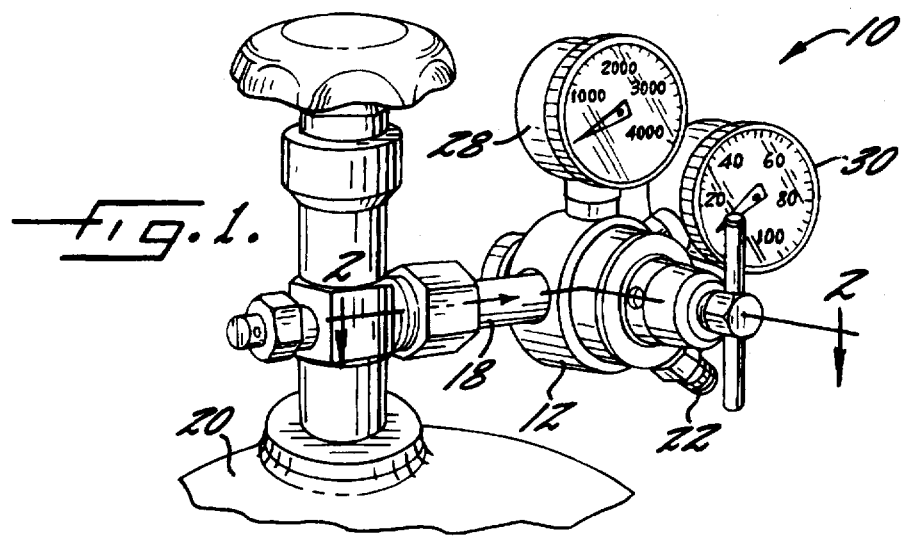
Fig. 1.
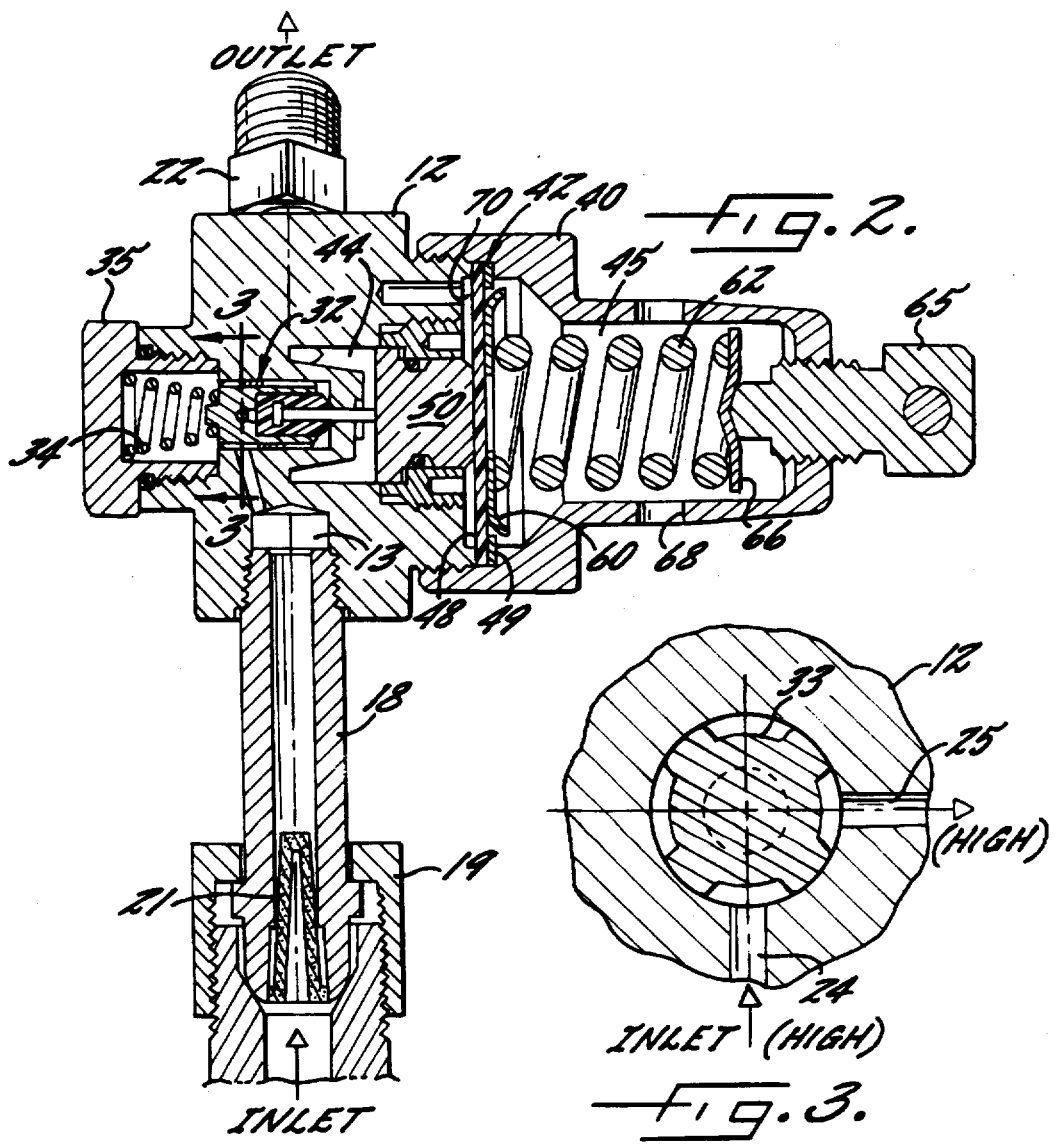
Fig. 2.
Fig. 3.

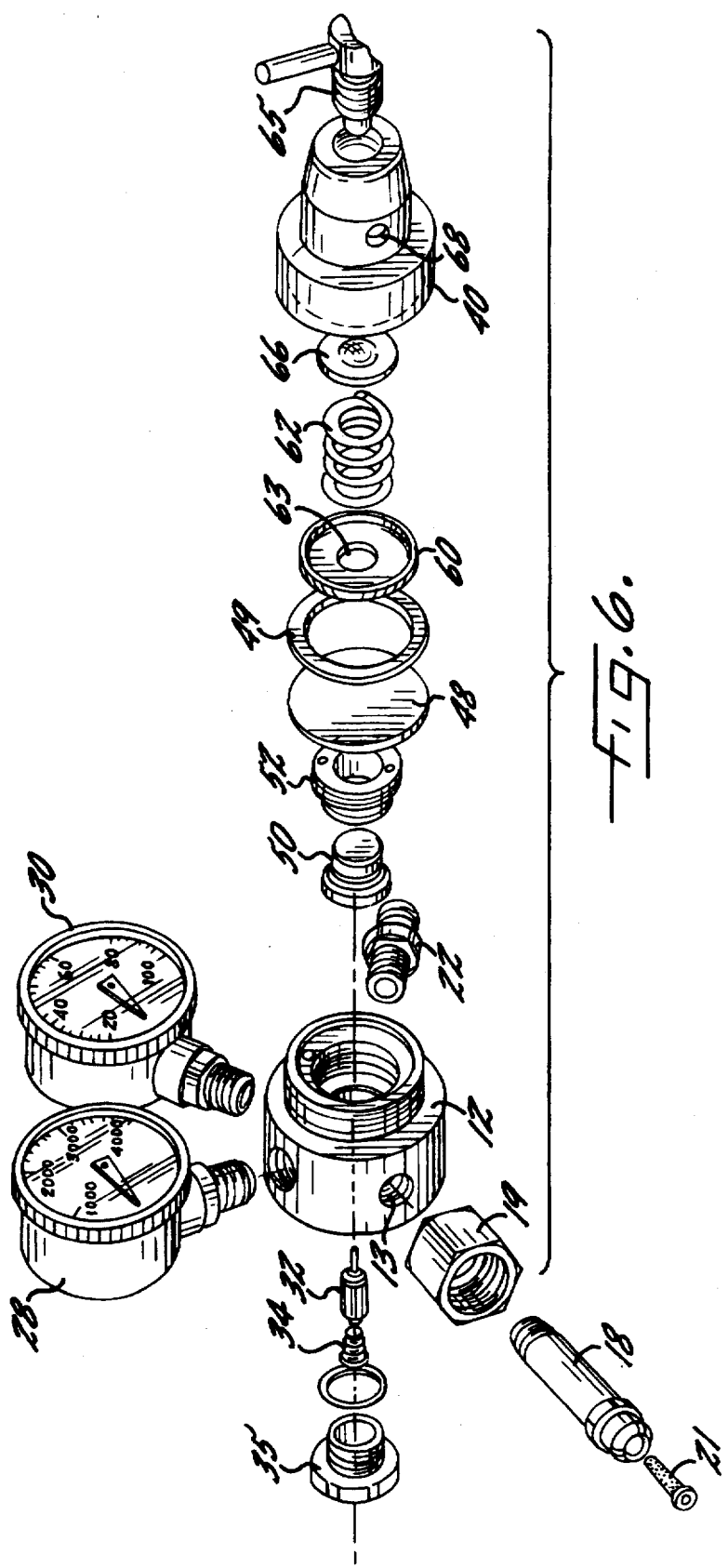

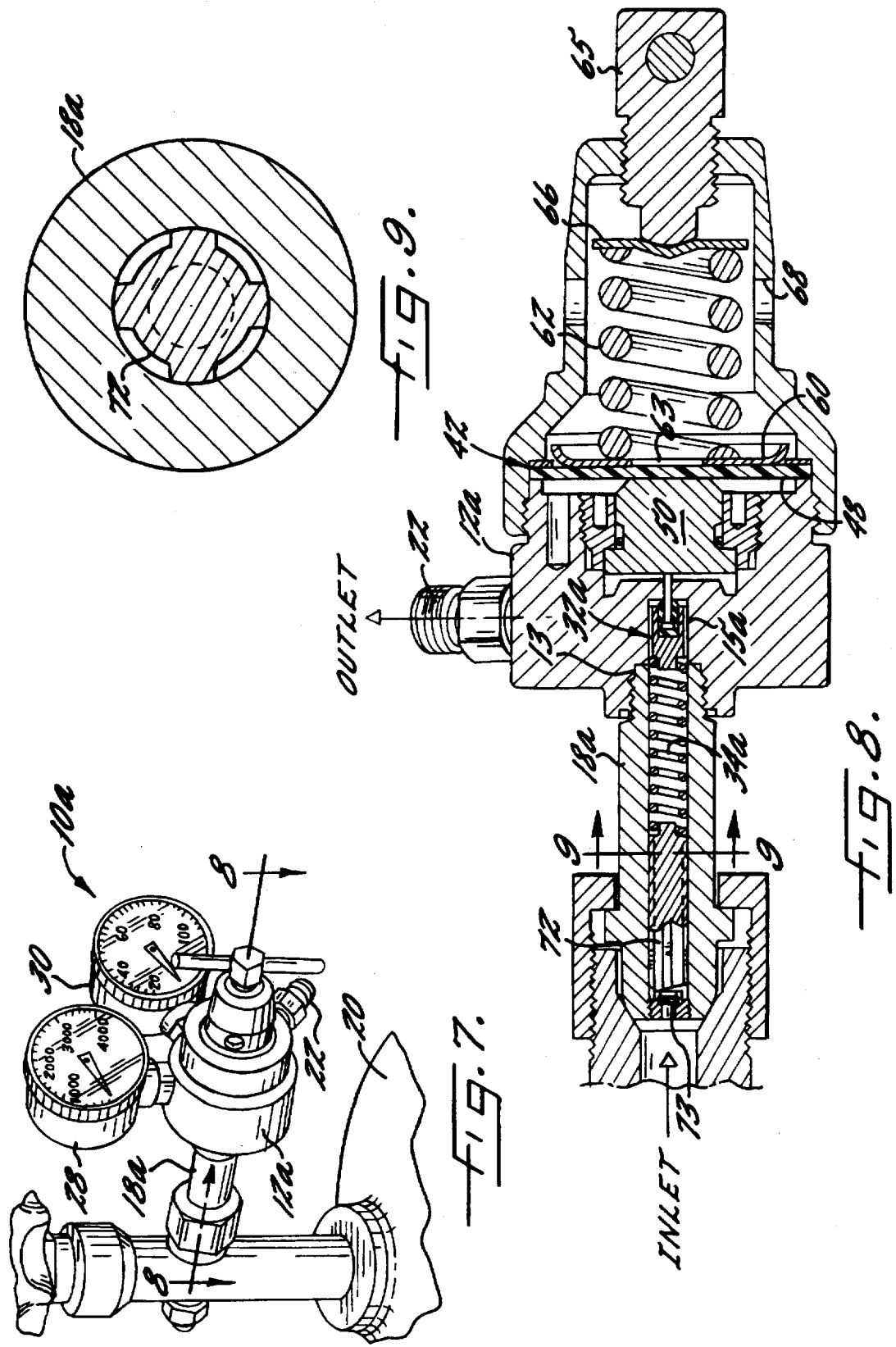

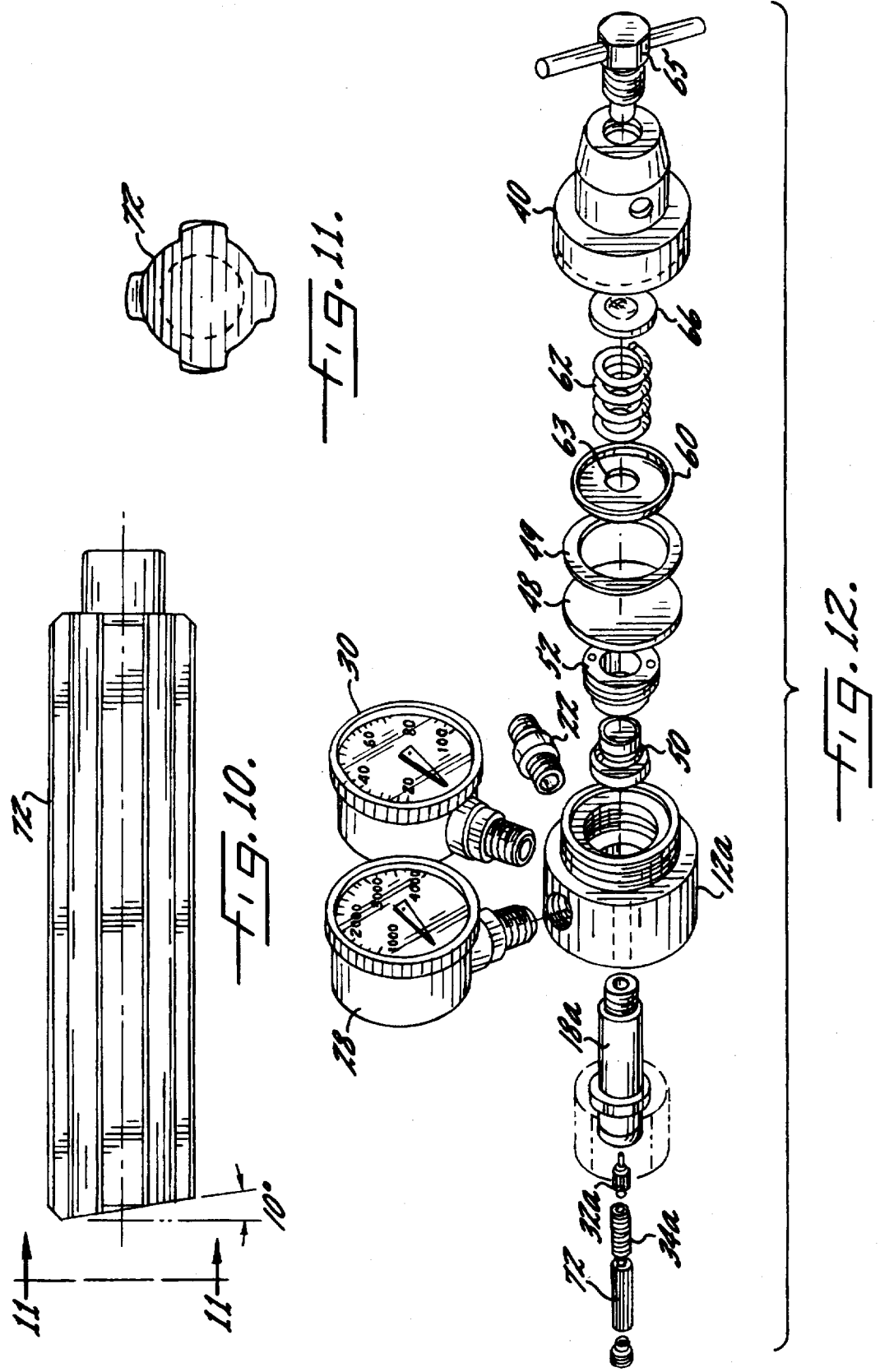

GAS PRESSURE REDUCING REGULATOR

BACKGROUND OF THE INVENTION

The present invention relates to a compressed gas regulator of the type which may be attached to a compressed gas cylinder so as to regulate the flow of the gas therefrom.

A regulator of the described type is disclosed in U.S. Pat. No. 2,768,643, and which comprises a casing which mounts a valve positioned between inlet and outlet gas passages, and a diaphragm clamped within the casing so as to be moveable to adjust the size of the opening of the valve. The movement of the diaphragm, and thus the pressure of the gas being discharged, are controlled by a manually adjustable screw, which controls the loading of a spring which engages the diaphragm.

U.S. Pat. No. 4,516,595 discloses a similar regulator which includes a plunger positioned to isolate the diaphragm from the valve seat in response to a spontaneous ignition or overpressure within the regulator body upstream of the diaphragm. By immediately closing off the diaphragm chamber, ignition of the diaphragm is essentially prevented, thereby substantially reducing the potential for operator injury resulting from such an ignition.

It is an object of the present invention to provide an improved gas regulator of the described type, which includes provision for the further reduction in the potential for damage and operator injury resulting from a spontaneous ignition within the regulator body.

It is a more particular object of the present invention to provide an improved gas regulator which provides a high degree of resistance to sustained combustion within the regulator body, in the event of a spontaneous oxygen fire, or the like, within the regulator.

It is also a particular object of the present invention to provide an improved gas regulator which includes a plunger for isolating the diaphragm from any spontaneous ignition of oxygen or flammable gases which may occur in the low pressure region of the regulator, and which further includes provision for releasing to the atmosphere any products of combustion and overpressure resulting from a spontaneous ignition of the gas, in the remote event such products and overpressure are able to pass around the plunger and reach the diaphragm.

SUMMARY OF THE INVENTION

The above and other objects and advantages of the present invention are achieved by the provision of a gas pressure reducing regulator which comprises a body member having an inlet passage, an outlet passage, and a valve chamber interconnecting the inlet passage and the outlet passage and which includes a valve seat. A valve slider is positioned in the valve chamber so as to permit controlled gas flow between the inlet and outlet passages and the valve slider is mounted for limited movement in an axial direction between a closed position closing the valve seat and an open position wherein the valve seat is open. The valve slider also includes a valve pin extending axially through the valve seat, and a first biasing spring is provided for biasing the valve slider toward the closed position. A closure cap is mounted to the body member so as to define a chamber on the outlet passage side of the valve seat, and a diaphragm assembly is mounted in the chamber for limited axial movement and so as to engage the valve pin of the valve slider. The diaphragm assembly also acts to axially divide the chamber into a lower chamber region on the side of the diaphragm assembly which faces the valve chamber, and an upper chamber region on the other side of the diaphragm assembly. The diaphragm assembly includes a flexible diaphragm which has one side which faces said upper chamber region.

A second biasing spring is provided for selectively biasing the diaphragm assembly and the valve slider in a direction against the force of the first spring so as to cause the valve slider to move a controlled distance away from the closed position and thereby open the valve seat. A back-up plate overlies the one side of the flexible diaphragm, and the second spring engages the back-up plate so as to bias the diaphragm assembly toward the valve slider. The back-up plate includes a vent opening extending axially therethrough, and the closure cap includes a vent for venting the upper chamber region of the chamber to the atmosphere.

In the event of an overpressure in the lower chamber region resulting for example from ignition of the gas passing through the regulator and such overpressure reaches the flexible diaphragm, the flexible diaphragm is able to rupture and release the pressure through the vent opening in the back-up plate and then through the vent in the closure cap so that the pressure is released to the atmosphere.

In the preferred embodiment, the vent opening in the back-up plate is disposed centrally therein, so that the back-up plate is in the form of an annular disc. Also, the diaphragm assembly preferably includes a plunger, and means mounting the plunger in the chamber between the flexible diaphragm and the valve pin, and for limited movement in the axial direction. By this arrangement, the plunger provides a physical barrier between the lower chamber region and the flexible diaphragm.

BRIEF DESCRIPTION OF THE DRAWINGS

Some of the objects and advantages of the present invention having been stated, others will appear as the description proceeds, when considered in conjunction with the accompanying drawings, in which:

FIG. 1 is a perspective view of a gas pressure reducing regulator which embodies the present invention, and attached to a conventional gas cylinder;

FIG. 2 is a sectional view of the regulator taken substantially along the line 2—2 of FIG. 1;

FIG. 3 is a fragmentary, sectional view taken substantially along the line 3—3 of FIG. 2 and showing the cross section of the valve slider;

FIG. 6 is an exploded, perspective view of the regulator;

FIG. 7 is a perspective view illustrating a second embodiment of the regulator of the present invention;

FIG. 8 is a sectional view taken substantially along the line 8—8 of FIG. 7;

FIG. 9 is an enlarged sectional view taken substantially along the line 9—9 of FIG. 8 and illustrating the cross section of the fluted rod of the second embodiment;

FIG. 10 is an elevational view of the fluted rod;

FIG. 11 is an end view of the fluted rod; and

FIG. 12 is an exploded perspective view of the second embodiment.

DETAILED DESCRIPTION OF THE PREFERRED EMBODIMENTS

Figure 4:
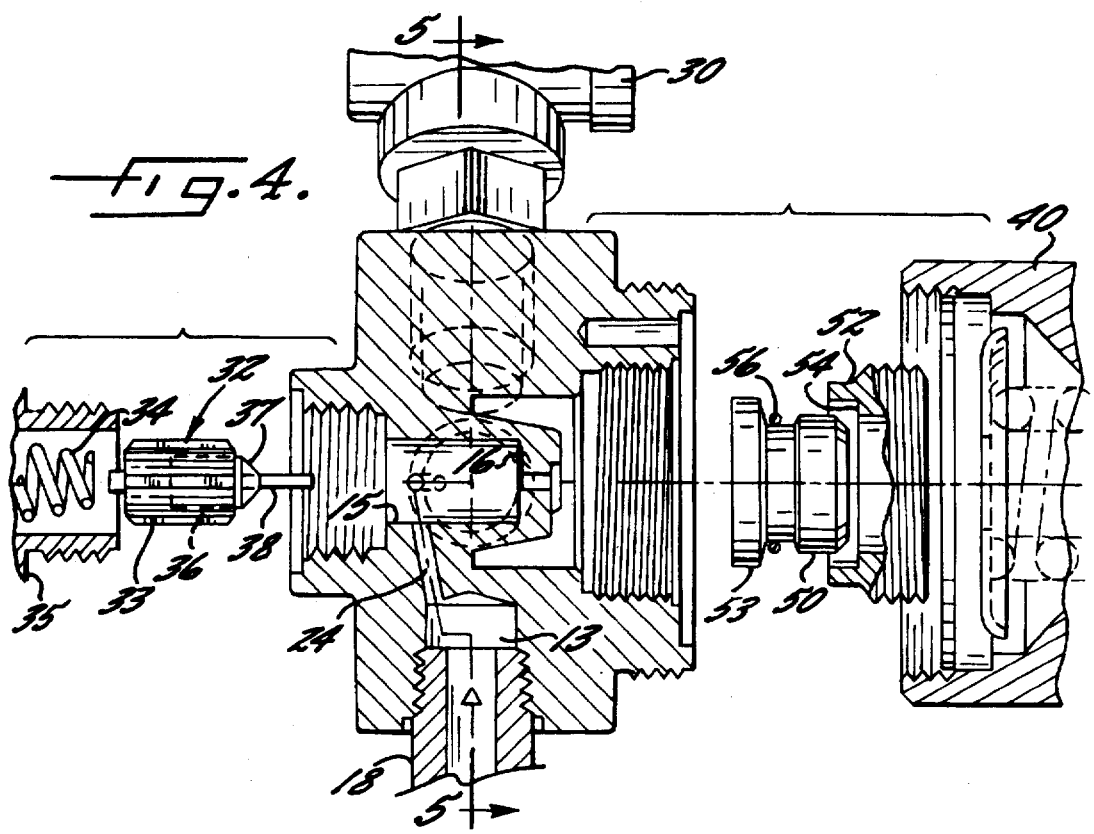
FIG. 4 is a fragmentary, exploded sectional view of the regulator.

Referring more particularly to the drawings, FIGS. 1–6 illustrate a first embodiment of a regulator 10 in accordance with the present invention. The regulator 10 comprises a body member 12 which is typically fabricated from a copper alloy, and which has an inlet passage 13, an outlet passage 14, and a valve chamber 15 interconnecting the inlet passage and the outlet passage. The inner end of the valve chamber 15 defines a valve seat 16. An inlet connector tube 18 is threadedly fixed in the inlet passage 13, and the inlet connector tube 18 mounts a threaded coupling 19 for securing the tube to the output line of a conventional gas cylinder, such as an oxygen cylinder 20. A conventional filter 21 may be positioned in the inlet connector tube, if desired. Also, an outlet connector tube 22 is threadedly fixed in the outlet passage 14, with the outlet connector tube 22 being adapted for connection to the equipment being serviced by the regulator.

Figure 5:
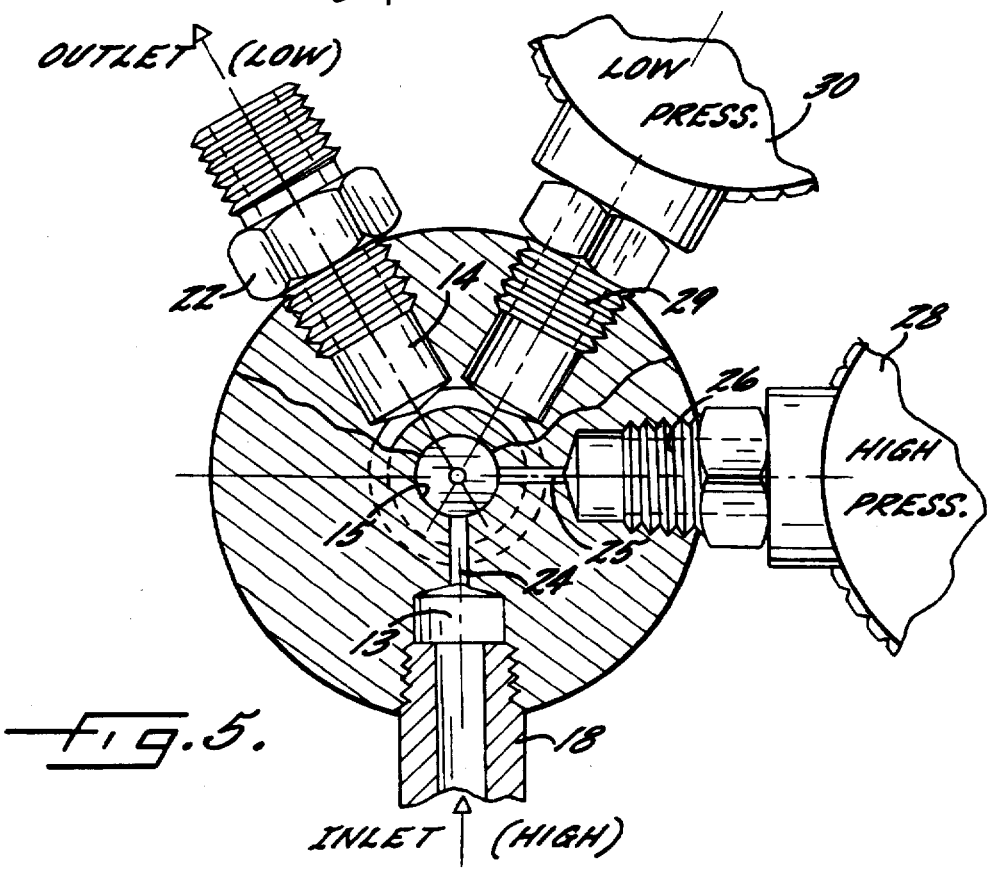
FIG. 5 is a sectional view taken substantially along the line 5—5 of FIG. 4.

The inlet passage 13 includes a small diameter bore 24 which is drilled at an angle into the body member at the inner end of the inlet passage, and extends radially into the valve chamber 15, note FIGS. 4 and 5. The small size of the bore 24 acts to slow and absorb some of the energy of the incoming gas before it reaches the valve seat 16. As also seen in FIG. 5, a second radial bore 25 extends from the valve chamber 15 and communicates with a threaded passage 26 which is adapted to mount a high pressure gauge 28, so that the pressure in the inlet passage can be readily determined by the operator.

A further threaded passage 29 communicates with the outlet passage 14 and is adapted to mount a low pressure gauge 30, so that the outlet pressure can also be readily observed.

A valve slider 32 is positioned in the valve chamber 15 so as to permit controlled gas flow between the inlet and outlet passages. The valve slider 32 comprises a cylindrical metal body 33 having flutes on the exterior surface as best seen in FIG. 3, and it is mounted for limited movement in an axial direction between a closed position closing the valve seat 16 as seen in FIG. 2, and an open position wherein the valve seat is open.

To bias the valve slider 32 toward its closed position, there is provided a valve closing helical spring 34 which is mounted in a cavity in a housing 35, which is threadedly joined to the body member 12. The spring 34 is preferably made of a metal alloy which is highly resistant to ignition in the event of an oxygen fire in the inlet passage, such as the nickel alloy sold under the trademark Inconel Alloy 750 by Inco Alloys International of Huntington, W.V.

The cylindrical body 33 of the valve slider 32 includes a cavity 36 (FIG. 4) in the end thereof adjacent the valve seat 16, with the cavity 36 being filled with an elastomeric material 37, such as a thermoplastic polyurethane. The elastomeric material 37, in turn, mounts a valve pin 38 which extends axially through the valve seat 16. The portion of the elastomeric material surrounding the pin 38 is of a conical configuration, and extends axially beyond the end of the body 33 of the slider 32, so as to sealably engage the valve seat 16 when the valve slider is pushed in a valve closing direction by the valve closing spring 34.

A closure cap 40 is threadedly mounted to the body member 12 so as to define a chamber on the outlet passage side of the valve seat. A diaphragm assembly 42 is mounted in the chamber for limited axial movement and so as to engage the valve pin 38 and axially divide the chamber into a lower chamber region 44 on the side of the diaphragm assembly which faces the valve chamber, and an upper chamber region 45 on the other side of the diaphragm assembly. As best seen in FIG. 2, the valve pin 38 extends into the lower chamber region 44, and the lower chamber region is in direct communication with the outlet passage 14 and the threaded passage 29 leading to the gauge 30.

The diaphragm assembly 42 includes a flexible elastomeric diaphragm 48 which is clampingly secured between the body member 12 and the closure cap 40. The diaphragm 48 typically comprises a sheet of neoprene rubber having a thickness of about 0.07 inches. Also, the diaphragm assembly includes a brass slip ring 49 positioned between the diaphragm 48 and a shoulder on the closure cap 40, and a plunger 50 which is mounted in an annular retainer 52 which is threadedly secured in the body member 12. The plunger 50 comprises a solid cylindrical metal body having an annular flange 53 mounted at one end thereof, and the annular retainer 52 is sized to closely receive the cylindrical body of the plunger therein. The retainer 52 further includes an annular shoulder 54 positioned to engage the annular flange 53 of the plunger and thereby limit the movement of the plunger in a direction away from the valve seat 16. The diaphragm assembly 42 further comprises a resilient sealing ring 56 mounted in an annular groove in the body of the plunger 50 and so as to form a seal between the body and the annular retainer 52. The sealing ring 56 is desirable in high pressure applications, such as 500 lbs. delivery pressure, but it may be omitted in lower pressure applications.

A spring biasing means is provided for selectively biasing the diaphragm assembly 42 and the valve slider 32 in a direction against the force of the valve closing spring 34, so as to cause the valve slider 32 to move a controlled distance away from the closed position and thereby open the valve seat 16. The spring biasing means includes a metal back-up plate 60 overlying the side of the flexible diaphragm 48 which faces the upper chamber region 45, and a helical spring 62 mounted in the upper chamber region 45 so as to engage the back-up plate 60 and thereby bias the diaphragm assembly 42 toward the valve slider 32. The back-up plate 60 has a circular periphery and includes a vent opening 63 extending axially therethrough, and with the vent opening being disposed centrally in the plate, as best seen in FIG. 6. In one specific embodiment, the diameter of the vent opening 63 is about one-third the diameter of the back-up plate. The spring biasing means further comprises a pressure adjusting screw 65 which is threadedly mounted to the closure cap 40 so as to engage a spring plate 66, with the plate 66 in turn engaging the end of the spring 62 which is opposite the back-up plate 60.

The closure cap 40 further includes a pair of vent openings 68 which vent the upper chamber region 45 to the atmosphere, for the purposes described below.

In normal operation, the pressure adjusting screw 65 is initially unthreaded to release the pressure of the spring 62 on the diaphragm assembly 42. The valve seat 16 is thus closed by reason of the force exerted on the valve slider 32 by the spring 34. The valve on the gas cylinder 20 is then opened, to permit the gas to flow into the regulator via the connector tube 18. The gas will be stopped at the valve seat 16, until the pressure adjusting screw 65 is advanced so as to withdraw the valve slider 32 from the seat 16 a controlled distance. The advance of the pressure adjusting screw 65 is continued until the desired delivery pressure is reached, as indicated by the low pressure gauge 30.

When the flow of a gas such as oxygen is being regulated, there is an inherent risk that the gas might ignite in the regulator if proper safety procedures are not followed. If ignition occurs, the internal components most likely to ignite are the valve closing spring 34 and the elastomeric material 37 of the slider valve 32. With the present invention, the valve closing spring 34 is made from Inconel alloy rather than the usual carbon steel, so as reduce the likelihood of ignition, and the amount of the elastomeric material 37 is kept to a minimum to reduce the kindling energy available to raise the temperature to a level sufficient to ignite the copper alloy of the body member 12. When the elastomeric material 37 burns away, the valve pin 38 drops to the bottom of the cavity 36, which allows the valve slider 32, aided by the valve closing spring 34, to move against and substantially close the valve seat 16. This action halts the progress of the ignition, allowing the products of combustion, carbon dioxide and water, to extinguish the fire. Any gas pressure build-up due to the short duration combustion is trapped in the lower chamber region 44, because the plunger 50 acts as a physical barrier and a check valve. Thus, hot gases are prevented from entering the area 70 between the plunger 50 and the flexible diaphragm 48.

In the remote event that any hot gases are able to pass through the relatively small clearance and the sealing ring 56 between the plunger 50 and the annular retainer 52, and so as to reach the flexible diaphragm 48, the flexible diaphragm 48 is able to rupture and release the pressure through the vent opening 63 in the back-up plate 60. The gas then vents through the openings 68 in the closure cap 40, so that the pressure is released to the atmosphere. Stated in other words, when overpressure is sensed in the area 70 between the plunger 50 and the diaphragm 48, the diaphragm 48 lifts off the plunger 50 and, at a predetermined pressure, ruptures and safely vents the overpressure through the openings 68 in the cap 40.

To further protect the flexible diaphragm 48 from ignition, a protective thin metal plate (not shown) may be positioned between the flexible diaphragm and the plunger, with the protective plate having an opening aligned with the vent opening 63 in the back-up plate 60. Thus, the thin metal plate will not interfere with the rupturing of the diaphragm 48 in the manner described above.

FIGS. 7-12 illustrate a second embodiment of a regulator 10a which embodies the invention, wherein the inlet passage 13a is positioned in the rear end of the body member 12a and so as to be in axial alignment and communication with the valve chamber 15a. In addition, the inlet connector tube 18a has an internal bore which mounts a fluted rod 72, with the valve closing spring 34a being disposed between the fluted rod 72 and the valve slider 32a. Also, a gas filter 73 is mounted at the inlet end of the tube 18a, and the outer end of the fluted rod 72 is beveled as seen in FIG. 10, to provide a beveled end which is inclined at an angle of about 10° from the perpendicular. This beveled surface acts to deflect the entering gas stream and thereby slow and absorb some of the energy of the incoming gas before it reaches the valve seat.

The embodiment of FIGS. 7-12 is suitable for use with certain types of gas cylinders which are configured so as to render it difficult to conveniently attach the regulator of FIGS. 1-6, but is otherwise structurally and functionally the same.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed is:

1. A gas pressure reducing regulator comprising
   a body member having an inlet passage, an outlet passage, and a valve chamber interconnecting said inlet passage and said outlet passage and which includes a valve seat,
   a valve slider positioned in said valve chamber so as to permit controlled gas flow between said inlet and outlet passages and mounted for limited movement in an axial direction between a closed position closing said valve seat and an open position wherein said valve seat is open, said valve slider including a valve pin extending axially through said valve seat, and first spring biasing means for biasing said valve slider toward said closed position,
   a closure cap mounted to said body member so as to define a chamber on the outlet passage side of said valve seat,
   a diaphragm assembly mounted in said chamber for limited axial movement and so as to engage said valve pin of said valve slider and axially divide the chamber into a lower chamber region on the side of the diaphragm assembly which faces the valve chamber, and an upper chamber region on the other side of said diaphragm assembly, said diaphragm assembly including a flexible diaphragm which has one side which faces said upper chamber region,
   second spring biasing means for selectively biasing said diaphragm assembly and said valve slider in a direction against the force of said first spring biasing means so as to cause said valve slider to move a controlled distance away from said closed position and thereby open said valve seat, said second spring biasing means including a back-up plate overlying said one side of said flexible diaphragm, and a spring mounted in said upper chamber region and engaging said back-up plate and so as to bias said diaphragm assembly toward said valve slider, and with said back-up plate including a vent opening extending axially therethrough,
   said closure cap including vent means venting said upper chamber region of said chamber to the atmosphere,
   whereby in the event of an overpressure in said lower chamber region resulting for example from ignition of the gas passing through said regulator, and such overpressure reaches the flexible diaphragm, the flexible diaphragm is able to rupture and release the pressure through said vent opening in said back-up plate and then through said vent means in said closure cap so that the pressure is released to the atmosphere.

2. The gas pressure reducing regulator as defined in claim 1 wherein said back-up plate has a circular periphery and said vent opening in said back-up plate is disposed centrally therein.

3. The gas pressure reducing regulator as defined in claim 2 wherein said diaphragm assembly further includes a plunger, and means mounting said plunger in said chamber between said flexible diaphragm and said valve pin and for limited movement in said axial direction, and so that the plunger provides a physical barrier between said lower chamber region and said flexible diaphragm.

4. The gas pressure reducing regulator as defined in claim 3 wherein said plunger comprises a cylindrical body and an annular flange mounted at one end of said cylindrical body, and said means mounting said plunger in said chamber comprises an annular retainer which is fixedly mounted in said chamber and which closely receives said cylindrical body of said plunger therein, and with said annular retainer including an annular shoulder positioned to engage said annular flange of said plunger and thereby limit the movement of the plunger in a direction away from said valve seat.

5. The gas pressure reducing regulator as defined in claim 4 wherein said diaphragm assembly further comprises a resilient sealing ring positioned between said cylindrical body of said plunger and said annular retainer.

6. The gas pressure reducing regulator as defined in claim 4 wherein said closure cap is threadedly connected to said body member so as to permit the removal of the closure cap, and wherein said flexible diaphragm is clampingly secured between said body member and said closure cap.

7. The gas pressure reducing regulator as defined in claim 6 wherein said annular retainer is threadedly connected in said chamber so as to permit the removal of said annular retainer and said plunger from said body member.

8. The gas pressure reducing regulator as defined in claim 2 wherein said inlet passage includes means acting to slow and absorb some of the energy of the incoming gas before it reaches the valve seat.

9. The gas pressure reducing regulator as defined in claim 2 wherein said first spring biasing means comprises a helical spring which consists essentially of a nickel alloy which is highly resistant to ignition.

10. The gas pressure reducing regulator as defined in claim 2 wherein said second spring biasing means further comprises a pressure adjusting screw means threadedly mounted to said closure cap so as to engage the end of said spring which is opposite said back-up plate.

* * * * *